E. BECKER.
COOLING OF INTERNAL COMBUSTION ENGINES.
APPLICATION FILED SEPT. 29, 1917. RENEWED SEPT. 26, 1919.

1,371,543.

Patented Mar. 15, 1921.

Inventor
Edmund Becker

UNITED STATES PATENT OFFICE.

EDMUND BECKER, OF WASHINGTON, DISTRICT OF COLUMBIA.

COOLING OF INTERNAL-COMBUSTION ENGINES.

1,371,543.     Specification of Letters Patent.     Patented Mar. 15, 1921.

Application filed September 29, 1917, Serial No. 193,973. Renewed September 26, 1919. Serial No. 326,539.

*To all whom it may concern:*

Be it known that I, EDMUND BECKER, a citizen of the United States, residing at Washington, District of Columbia, have invented certain new and useful Improvements Relating to the Cooling of Internal-Combustion Engines, of which the following is a specification.

The present invention relates to the art of cooling internal combustion engines by introducing water in its liquid state, into the inside of the cylinder, so that the greater part of the cooling effect will be produced by the transformation of the objectionable heat into latent heat of vaporization; and so that the vaporized water when properly regulated shall have, in such case, the recognized advantage of increasing the efficiency of the engine as a transformer of heat into useful work.

The idea of introducing water directly into the cylinder as a simple cooling agent, and the different idea of introducing it, as an efficiency increasing agent, are both old and well known in the art. My present invention simply consists in providing means of introduction that is specially adapted to secure the two above-mentioned advantages simultaneously, and in the most effective manner avoiding the pressure of water where objectionable on account of its tendency to corrode the cylinder wall and to wash away the lubricant, and simplifying mechanical arrangement of the engine.

Such improved means consists in a novel application of the old and well known principle that is utilized in hot climates for cooling drinking water.

The water is placed in "alcarrazas", that is to say in vessels that are made of porous earthenware which allows part of the contained water to ooze through and escape as vapor containing a vast amount of heat which is in great part taken from the water that remains in the vessel.

The present invention consists in providing an engine cylinder having one of its walls, or a portion thereof, made of porous material, maintaining the outer face of the wall wet at all times and permitting the water to percolate through the porous material into the cylinder. More specifically it comprises the provision of a porous chamber placed in one end of the cylinder and means for maintaining water within the porous chamber, and permitting it to percolate through the porous walls into the cylinder. Any porous material, such as are generally used in filtering water, sandstone, pumice-stone, asbestos or baked ceramics may be employed.

Such operation is moreover automatically regulated by the internal pressure of the working gases, so as to be, as required, most active during the suction stroke of the engine, and least active during the working stroke. My invention is entirely independent of the piston rod and crank shaft, or other entirely different mechanical arrangements that may be used to transmit the relative displacements of piston and cylinder into useful work. It is likewise independent of any arrangements that may be used for firing the mixture. All such connections and other details are therefore omitted on the accompanying drawings, where:

Figure 1:
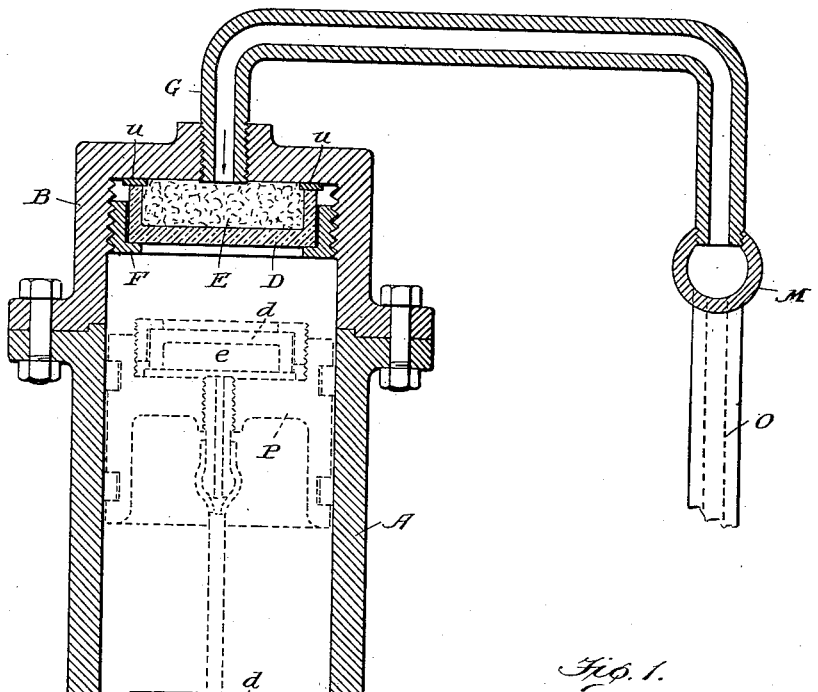
Figure 1 shows a longitudinal axial section of a cylinder and its piston, with my invention applied in slightly different forms to both of these elements.

In Fig. 1, the lubricated part of the cylinder wall is represented by A, which is flanged at its upper end to admit bolts for holding the combined cover and firing chamber B. The piston P is shown in full lines at the bottom of its stroke, and in dotted lines at the upper end of its stroke.

The bottom of the firing chamber is threaded internally to admit an externally threaded clamp ring F which serves to clamp the porous cup D firmly against a water-tight gasket *u*. The inside E of cup D is filled with a mass of absorbent material which receives the water from pipe G connected with the main feeders M and O.

The piston P has its top recessed to admit a necessarily smaller porous cup *d*, which is likewise held by a threaded clamp ring, and which is firmly pressed against a water-tight gasket *u*.

The chamber *e* of this smaller porous cup is shown, as an alternative form, without water-absorbent filling.

Water is led into chamber *e* by a threaded pipe *g* which connects through flexible pipe *h* with a tubular arm K. Arm K receives water from pipe *o* through main *m*, on which it is mounted to rock, so that it may follow the motions of the piston.

Figure 2:
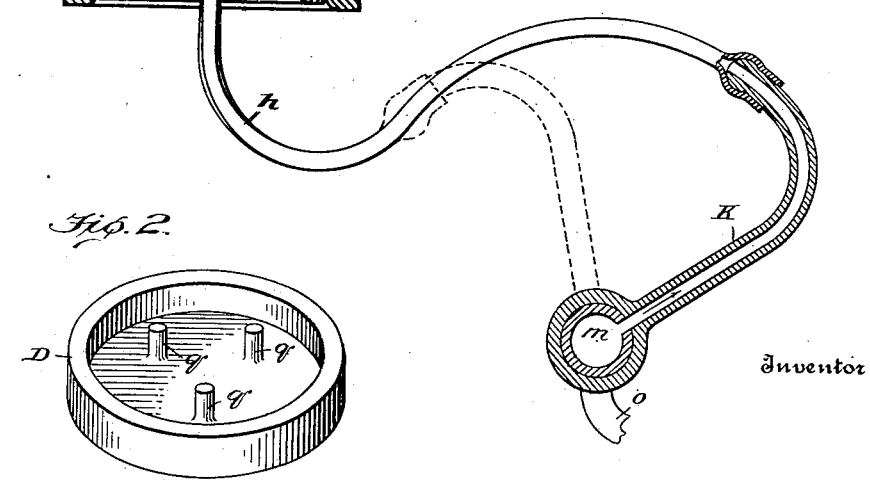
Fig. 2 is a perspective view of the larger porous cup with reinforced bottom that is used in the cylinder.

The larger porous cup D, as seen in Fig. 2, has its bottom strengthened by means of posts $q$, so that it may be kept thinner in other parts.

The rims of the two porous cups D and $d$ are made water-tight by glazing, as well understood in the pottery art.

What I claim and desire to secure by Letters Patent of the United States is:

1. In internal combustion engines, a cylinder chamber; a chamber adapted to receive water and hold it in a liquid state, a porous partition separating said chamber from the combustion chamber so that the water may be supplied to the engine cylinder through said porous partition.

2. The method of cooling an engine cylinder having a portion of one of its walls made of porous material which comprises maintaining the outer side of said porous wall wet, and permitting the water to percolate through the wall to the interior of the cylinder and evaporate.

3. An internal combustion engine comprising a cylinder having a piston therein, a wall and cylinder heads forming an inclosure for said piston, a portion of said inclosure being made of porous material, means for maintaining the outer surface of said porous portion wet whereby the water will percolate through the porous wall to the interior of the cylinder and evaporate.

4. A combination of an internal combustion engine comprising a cylinder and piston and means for supplying moisture to the interior of the cylinder comprising a chamber arranged in one end of the cylinder and separated therefrom, the separating wall being made of porous material and means for maintaining moisture in said chamber.

5. A combination of an internal combustion engine comprising a cylinder and piston and means for supplying moisture to the interior of the cylinder comprising a chamber arranged in one end of the cylinder and separated therefrom, the separating wall being made of porous material, means for maintaining moisture in said chamber, and means for varying the action of said first mentioned means to vary the supply of moisture.

In testimony whereof, I affix my signature.

EDMUND BECKER.